United States Patent
Sharon et al.

(10) Patent No.: US 7,920,748 B2
(45) Date of Patent: Apr. 5, 2011

(54) APPARATUS AND SOFTWARE FOR GEOMETRIC COARSENING AND SEGMENTING OF STILL IMAGES

(75) Inventors: Eitan Sharon, San Mateo, CA (US); Achi Brandt, San Mateo, CA (US); Asael Moshe, Sunnyvale, CA (US)

(73) Assignee: Videosurf, Inc., San Mateo, CA (US)

( * ) Notice: Subject to any disclaimer, the term of this patent is extended or adjusted under 35 U.S.C. 154(b) by 912 days.

(21) Appl. No.: 11/802,498

(22) Filed: May 23, 2007

(65) Prior Publication Data

US 2008/0292187 A1    Nov. 27, 2008

(51) Int. Cl.
*G06K 9/46* (2006.01)
(52) U.S. Cl. ................... 382/232; 382/274; 382/275
(58) Field of Classification Search .......... 382/235, 382/236, 243, 278, 282
See application file for complete search history.

(56) References Cited

U.S. PATENT DOCUMENTS

| | | | |
|---|---|---|---|
| 4,639,773 A | 1/1987 | Hurst | |
| 5,392,223 A | 2/1995 | Caci | |
| 5,410,643 A * | 4/1995 | Yomdin et al. | 345/420 |
| 5,473,384 A | 12/1995 | Jayant et al. | |
| 5,638,135 A * | 6/1997 | Mukai | 348/642 |
| 5,838,838 A | 11/1998 | Overton | |
| 5,886,745 A | 3/1999 | Muraji et al. | |
| 5,923,775 A | 7/1999 | Snyder et al. | |
| 6,229,929 B1 * | 5/2001 | Lynch et al. | 382/268 |
| 6,370,543 B2 | 4/2002 | Hoffert et al. | |
| 6,396,948 B1 * | 5/2002 | Lynch et al. | 382/166 |
| 6,442,203 B1 | 8/2002 | Demos | |
| 6,462,768 B1 | 10/2002 | Oakley | |
| 6,643,387 B1 | 11/2003 | Sethuraman et al. | |
| 6,714,929 B1 | 3/2004 | Micaelian et al. | |
| 6,718,365 B1 | 4/2004 | Dutta | |
| 6,766,037 B1 | 7/2004 | Le et al. | |
| 6,792,575 B1 | 9/2004 | Samaniego et al. | |
| 6,891,891 B2 | 5/2005 | Pau et al. | |
| 7,031,555 B2 | 4/2006 | Troyanker | |
| 7,042,527 B2 | 5/2006 | Imai | |
| 7,080,392 B1 | 7/2006 | Geshwind | |
| 7,146,361 B2 | 12/2006 | Broder et al. | |
| 2002/0003900 A1 | 1/2002 | Kondo | |
| 2002/0114394 A1 | 8/2002 | Ma | |
| 2003/0088554 A1 | 5/2003 | Ryan et al. | |

(Continued)

FOREIGN PATENT DOCUMENTS

CN    1199449 C    4/2005

(Continued)

OTHER PUBLICATIONS

Delgo et al., U.S Office Action mailed on Aug. 27, 2009, directed to U.S. App. No. 11/687,326; 58 pages.

(Continued)

*Primary Examiner* — Yosef Kassa
(74) *Attorney, Agent, or Firm* — Morrison & Foerster LLP

(57) ABSTRACT

An apparatus and software for processing an image reduces the number of pixels constituting the image by sequentially eliminating alternate rows and columns of pixels, the information represented by each pixel being eliminated (a "source" pixel) being redistributed into adjacent "destination" pixel locations. The redistribution is made in proportion to the similarity between the source and each destination pixel, e.g., similarity of color and/or luminance values.

26 Claims, 7 Drawing Sheets

U.S. PATENT DOCUMENTS

| | | | |
|---|---|---|---|
| 2003/0097301 | A1 | 5/2003 | Kageyama et al. |
| 2003/0120652 | A1 | 6/2003 | Tifft |
| 2004/0013305 | A1 | 1/2004 | Brandt et al. |
| 2005/0179814 | A1 | 8/2005 | Pau et al. |
| 2005/0216851 | A1 | 9/2005 | Hull et al. |
| 2005/0275626 | A1 | 12/2005 | Mueller et al. |
| 2006/0122997 | A1 | 6/2006 | Lin |
| 2006/0291567 | A1 | 12/2006 | Filippini et al. |
| 2007/0078832 | A1 | 4/2007 | Ott, IV et al. |
| 2007/0157239 | A1 | 7/2007 | Wang et al. |
| 2007/0185858 | A1 | 8/2007 | Lu et al. |
| 2008/0118107 | A1 | 5/2008 | Sharon et al. |
| 2008/0118108 | A1 | 5/2008 | Sharon et al. |
| 2008/0120290 | A1 | 5/2008 | Delgo et al. |
| 2008/0120291 | A1 | 5/2008 | Delgo et al. |
| 2008/0120328 | A1 | 5/2008 | Delgo et al. |
| 2008/0159622 | A1 | 7/2008 | Agnihotri et al. |
| 2008/0159630 | A1 | 7/2008 | Sharon et al. |
| 2008/0292188 | A1 | 11/2008 | Ettan et al. |

FOREIGN PATENT DOCUMENTS

| | | |
|---|---|---|
| EP | 1152621 | 11/2001 |
| EP | 1732329 | 12/2006 |
| JP | 6105211 | 4/1994 |

OTHER PUBLICATIONS

Delgo et al., U.S Office Action mailed on Aug. 27, 2009 directed at U.S. Appl. No. 11/687,300; 56 pages.
International Search Report and Written Opinion mailed on Aug. 24, 2009 directed at application No. PCT/US2009/50409; 11 pp.
Polimeni, J. et al. "Space-time Adaptive Image Representations: Data Structures, Hardware and Algorithms," in Defining a Motion Imagery Research and Development Program workshop, Virginia's Center for Innovative Technology: published Nov. 20, 2001, located at <http://eslab.bu.edu/publications/proceedings/2001/polimeni2001space-time.pdf> visited on Aug. 13, 2009. 23 pages.
International Search Report and Written Opinion, mailed Sep. 22, 2008, directed to counterpart International Patent Application No. PCT/US08/64683; 14 pages.
International Search Report and Written Opinion issued for PCT/US2007/024197; dated May 19, 2008; 5 pages.
International Preliminary Report on Patentability and Written Opinion dated Jun. 4, 2009 directed at related application No. PCT/US2007/024198; 5 pages.
International Search Report and Written Opinion issued for PCT/US2007/024199; dated May 22, 2008; 4 pages.
International Search Report mailed on Sep. 22, 2008 directed at counterpart application No. PCT/US2008/64683;1 page.
Delgo et al., U.S Office Action mailed on Dec. 29, 2008 directed at U.S. Appl. No. 11/687,300; 52 pages.
Delgo et al., U.S Office Action mailed on Dec. 29, 2008 directed at U.S. Appl. No. 11/687,326; 54 pages.
Delgo et al., U.S Office Action mailed on Dec. 22, 2008 directed at U.S. Appl. No. 11/687,290; 52 pages.
Delgo et al., U.S Office Action mailed on Jul. 8, 2009 directed at U.S. Appl. No. 11/687,290; 57 pages.
"Object Classification by Statistics of Multi-scale Edges Based on BD Integrals", Anonymous CVPR submission, Paper ID 1413, 1-6, Nov. 2005.
Borenstein et al., "Combining Top-Down and Bottom-Up Segmentation", 2004 Conference on Computer Vision and Pattern Recognition Workshop, 27-02 Jun. 2004, 1-8.
Borenstein et al., "Combining Top-Down and Bottom-Up Segmentation", Proceedings IEEE workshop on Perceptual Organization in Computer Vision, IEEE Conference on Computer Vision and Pattern Recognition, Washington, DC, Jun. 2004.
Bourke, Intersection Point of Two Lnes (2 Dimensions), http://local.wasp.uwa.edu.au/~pbourke/geometry/lineline2d/, (Apr. 1989), 1-2.
Brandt et al., "Fast Calculation of Multiple Line Integrals"; SIAM J. Sci. Comput., 1999,1417-1429, vol. 20(4).
Cai et al., "Mining Association Rules with Weighted Items", Database Engineering and Applications Symposium, 1998. Proceedings. IDEAS'98. International, Jul. 8-10, 1998, 68-77.
Corso et al., "Multilevel Segmentation and Integrated Bayesian Model Classification with an Application to Brain Tumor Segmentation", Medical Image Computing and Computer- Assisted Intervention (MICCAI), 2006, Appeared in Springer's "Lecture Notes in Computer Science".
Galun et al., "Texture Segmentation by Multiscale Aggregation of Filter Responses and Shape Elements", Proceedings IEEE International Conference on Computer Vision, 716-723, Nice, France, 2003.
Gorelick et al., "Shape Representation and Classification Using the Poisson Equation", IEEE Transactions on Pattern Analysis and Machine Intelligence, Dec. 2006, 1991-2005, vol. 28(12).
Gorelick et al., "Shape Representation and Classification Using the Poisson Equation", Proceedings IEEE Conference on Computer Vision and Pattern Recognition, Washington, DC, Jun. 2004.
Lee et al., "A Motion Adapative De-interfacing Method Using an Efficient Spatial and Temporal Interpolation", IEEE Transactions on Consumer Electronics, 2003, 1266-1271, vol. 49(4).
Lindley, "Creation of an MPEG-7 Feature Extraction Plugin for the platform METIS", Universität Wien/TU Wien, 2006, Betreuer: R. King, W. Klas.
Lucas et al., "An Iterative Image Registration Technique with an Application to Stereo Vision", Proceedings of Imaging Understanding Workshop, 1981, 121-129.
Sharon et al., "Completion Energies and Scale", IEEE Transactions on Pattern Analysis and Machine Intelligence, 2000, 1117-1131, vol. 22(10).
Sharon et al., "Fast Multiscale Image Segmentation" Proceedings IEEE Conference on Computer Vision and Pattern Recognition, I:70-77, South Carolina, 2000.
Sharon et al., "2D-Shape Analysis using Conformal Mapping", Division of Applied Mathematics, Brown University, 1-31, 2005.
Sharon et al., "2D-Shape Analysis using Conformal Mapping", International Journal of Computer Vision, Oct. 2006, 55-75, vol. 70(1).
Sharon et al., "2D-Shape Analysis using Conformal Mapping", Proceedings IEEE Conference on Computer Vision and Pattern Recognition, Washington, DC, 2004, 1-8.
Sharon et al., "Completion Energies and Scale", Proceedings IEEE Conference on Computer Vision and Pattern Recognition, 1997, 884-890, Puerto Rico.
Sharon et al., "Hierarchy and Adaptivity in Segmenting Visual Scenes", Nature, 2006, Jun. 28th online; Aug. 17th print, 1-4.
Sharon et al., "Segmentation and Boundary Detection Using Multiscale Intensity Measurements", Proceedings IEEE Conference on Computer Vision and Pattern Recognition, I:469-476, Kauai, Hawaii, 2001.
Shi et al., "Good Features to Track," 1994 IEEE Conference on Computer Vision and Pattern Recognition (CVPR'94), 1994, 593-600.
Tao et al., "Weighted Association Rule Mining using Weighted Support and Significance Framework", In: The Ninth ACM SIGKDD International Conference on Knowledge Discovery and Data Mining (ACM SIGKDD 2003), Aug. 24-27, 2003, Washington DC, USA.
Sharon et al., U.S. Office Action mailed Aug. 26, 2010, directed to U.S. Appl. No. 11/687,261; 25 pages.
Sharon et al., U.S. Office Action mailed Aug. 26, 2010, directed to U.S. Appl. No. 11/687,341; 28 pages.

* cited by examiner

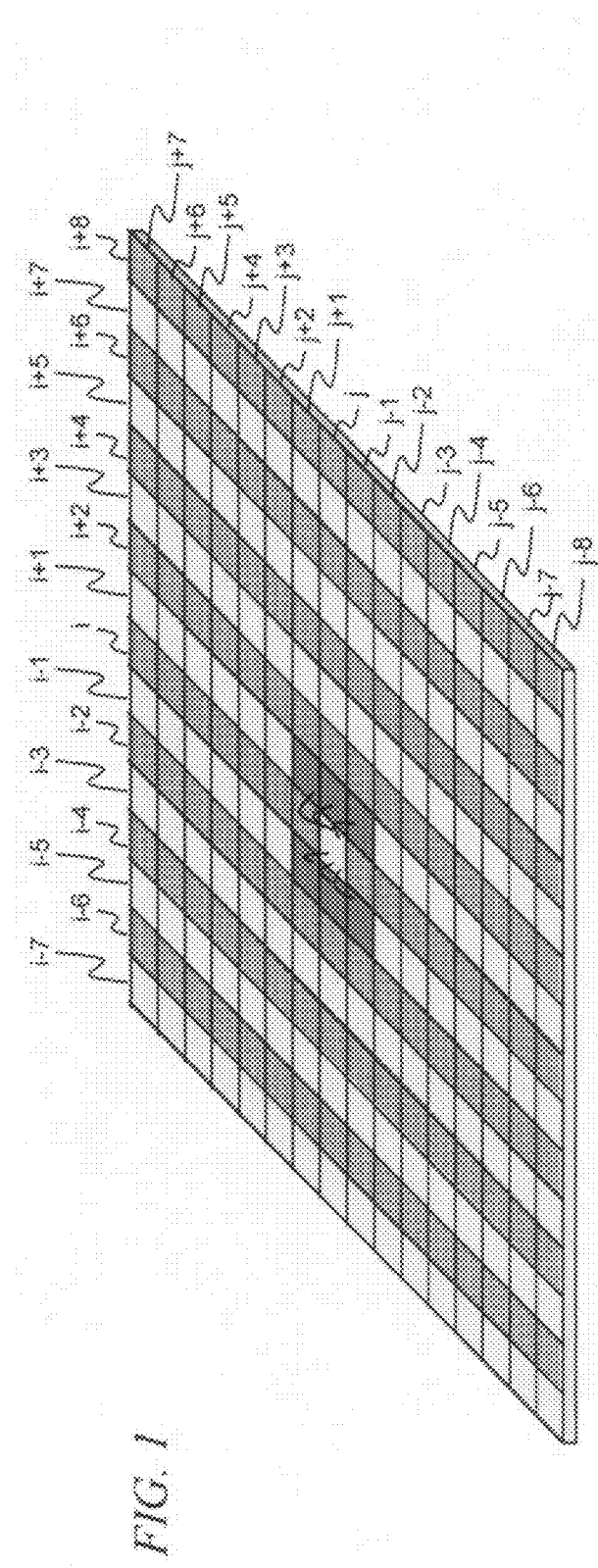
FIG. 1
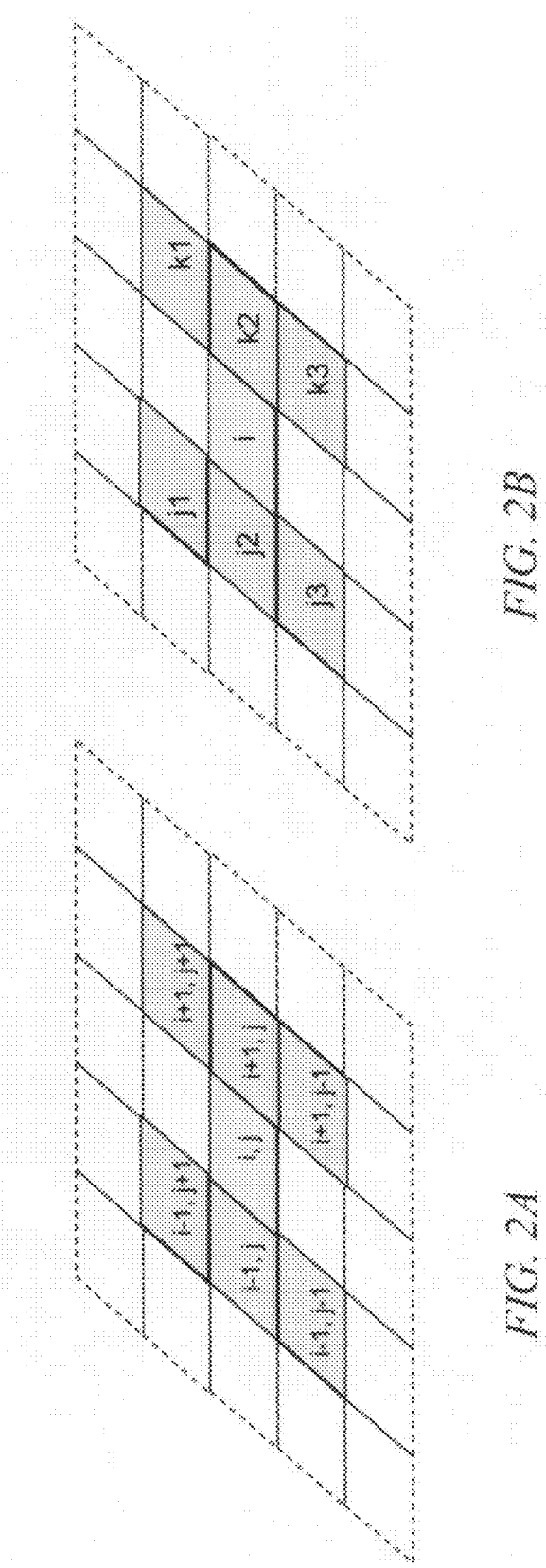
FIG. 2A
FIG. 2B

APPARATUS AND SOFTWARE FOR GEOMETRIC COARSENING AND SEGMENTING OF STILL IMAGES

FIELD OF THE INVENTION

The invention is directed to computer vision and, in particular, to image processing for segmentation.

BACKGROUND

Image segmentation has been a significant challenge in image analysis for many years. Segmentation requires a comprehensive computation over the entire image to obtain the appropriate partition into coherent regions which may indicate the existence of semantic objects. The computations involved are very expensive and hence faster methods providing improved results are needed. This disclosure presents methods, software and apparatus for a hierarchical process in which the entire image is processed in an extremely efficient manner including in frame-rate while screening a movie. Looking for regions of photometric coherency or color or texture coherency is essential for extracting semantic objects in the scene. The present invention addresses these and other requirements.

SUMMARY OF THE INVENTION

An apparatus for performing geometric coarsening and segmenting of an image representable as a two-dimensional array of pixels may includes one or more engines and/or software for selecting every other column of the array for accumulating information contained therein into adjacent columns; determining, for each pixel of each selected column, a similarity of the pixel with respect to a first set of nearest pixels of adjacent columns to form respective dependency values; distributing, for each pixel of each selected column, information for the pixel to the first set of pixels of adjacent columns wherein the information from the pixel is accumulated, together with any existing information of the pixel, and weighted by the respective dependency values; selecting every other row of the array for accumulating information contained therein into adjacent rows; determining, for each pixel of each selected row, a similarity of the pixel with respect to a second set of nearest six pixels of adjacent rows to form respective dependency values; and distributing, for each pixel of each selected row, information for the pixel to the second set of pixels of adjacent rows wherein the information from the pixel is accumulated, together with any existing information of the pixel, and weighted by the respective dependency values.

According a feature of one embodiment of the invention, the first set of pixels may comprise the six nearest pixels in adjacent columns and the second set of pixels comprise the six nearest pixels in adjacent rows.

According to another feature of an embodiment of the invention, column processing steps including column selection, pixel similarity determination, information distribution, are performed prior to row processing steps. An alternate embodiment may perform row processing prior to column processing.

According to another feature of an embodiment of the invention, columns and/or rows may be deleted subsequent to the corresponding information distributing step.

According to another feature of an embodiment of the invention, the sequences of steps providing for column and row elimination are repeated a plurality of time to achieve a desired image coarseness or size.

According to another feature of an embodiment of the invention, the similarity of pixels is determined based on specific color information endowed for each pixel and a specific similarity function appropriate to a type of the color information.

While the following description of a preferred embodiment of the invention uses an example based on indexing and searching of video content, e.g., video files, visual objects, etc., embodiments of the invention are equally applicable to processing, organizing, storing and searching a wide range of content types including video, audio, text and signal files. Thus, an audio embodiment may be used to provide a searchable database of and search audio files for speech, music, or other audio types for desired characteristics of specified importance. Likewise, embodiments may be directed to content in the form of or represented by text, signals, etc.

BRIEF DESCRIPTION OF THE DRAWINGS

The drawing figures depict preferred embodiments of the present invention by way of example, not by way of limitations. In the figures, like reference numerals refer to the same or similar elements.

FIG. 1 is a diagram representing an image as an array of pixels aligned in columns and rows;

FIG. 2a is a detailed diagram of a portion of an image represented by a central pixel and pixels adjacent thereto labeled according to a first convention using ordered pairs;

FIG. 2b is a detailed diagram of a portion of an image represented by a central pixel and pixels adjacent thereto labeled according to a second convention;

DETAILED DESCRIPTION OF THE PREFERRED EMBODIMENTS

Embodiments of the present invention reduce the number of pixels constituting an image by sequentially eliminating alternate rows and columns of pixels, the information represented by each pixel being eliminated (a "source" pixel) being redistributed into adjacent "destination" pixel locations. The redistribution is made in proportion to the similarity between the source and each destination pixel, e.g., similarity of color and/or luminance values. For example, as shown in FIG. 1, an image or portion of an image may be represented by a plurality of picture elements ("pixel") arranged in columns and rows. For purposes of reference, a subject source pixel element of a column "i" that is to be eliminated is located at the intersection of column i and row j, i.e., located at (i, j). The subject source pixel may store or contain information about a location of the image corresponding to the pixel location including, for example, luminance values for each of the primary additive colors: red, green and blue. Similarly, as further shown in FIG. 2a, adjacent destination pixels located at (i−1, j+1), (i−1, j), (i−1, j−1), (i+1, j+1), (i+1, j), and (i+1, j+1) store information about portions of the image corresponding the location of those pixels within the array of rows and columns (and possibly, as will be seen, information from previously eliminated pixels). Although otherwise adjacent to pixel (i, j), pixels (i, j+1) and (i, j−1) are also in column i that is to be eliminated and therefore are not suitable destinations for information that is to be retained. For ease of reference, cells in the column immediately adjacent to the left of the pixel to be eliminated are designated as j1, j2 and j3, while those to the right as k1, k2 and k3 as shown in FIG. 2b.

Preparatory to redistribution of information from source pixel i to destination pixels j1, j2, j3, k1, k2 and k3 is formulation of a transfer function. According to a preferred embodiment of the invention, information is transferred or redistributed based on color or intensity similarity between the source and destination pixels using an exponential function to further emphasize and prefer similar pixels and a distance component to prefer immediately adjacent pixels (i.e., j2 and k2) over diagonally adjacent pixels (i.e., pixels j1, j3, k1 and k3). Thus, a similarity value for diagonally adjacent destination pixels may obtained as:

$$D = e^{(-c \times dist|(source-destination)|)} \quad \text{(Eq. 1)}$$

while, for immediately adjacent destination pixels (those in the same row as the source pixel) as:

$$D = \sqrt{2} \times e^{(-c \times dist|(source-destination)|)} \quad \text{(Eq. 2)}$$

Figure 3A:
FIGS. 3A-3J are diagrams including various pixel groupings and the resultant information redistribution allocations.

The sum of the similarity values for all six destination pixels j1, j2, j3, k1, k2 and k3 must be normalized to provide a for distribution of the whole of the source pixel information among the six. FIGS. 3A-3J provide examples of normalized values for various source and destination values for c=0.05. For purposes of illustration, each pixel is assumed to have a luminance value of between 0 and 255. Referring to FIG. 3A wherein the source pixel and all destination pixels have the same value of 127, the similarity distances (i.e., absolute(dist (source−destination))) are equal. However, the similarity distances of the two immediately adjacent destination pixels j2 and k2 are enhanced by multiplying each by the square root of 2 such that about 20.7% of information from the source pixel is redistributed to those pixels while 14.6% of the information is redistributed to each of the remaining, diagonally adjacent destination pixels j1, j3, k1 and k3.

Figure 3B:
Figure 3C:
Figure 3D:
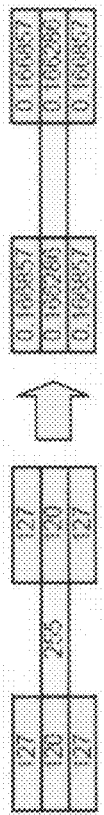
Figure 3E:
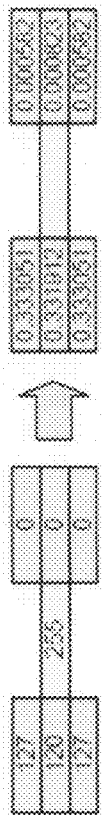
Figure 3F:
Figure 3G:
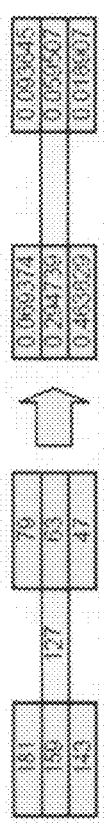
Figure 3H:
Figure 3I:
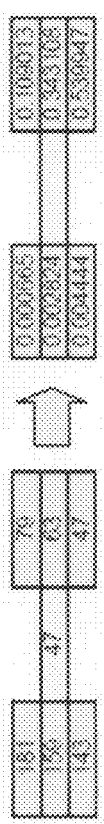
Figure 3J:
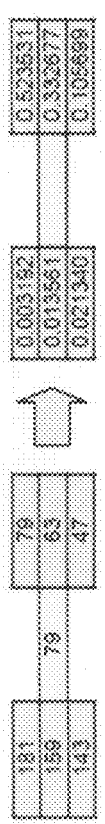

FIG. 3B illustrates a situation wherein, although the source and destination pixels are not identical, the distances between the source and each destination pixel are equal resulting in the same redistribution of information as in FIG. 3A. FIG. 3C illustrates a set of pixel values resulting in an approximately equal redistribution of information among all destination pixels, FIG. 3D illustrating another set of values achieving the same results. FIG. 3E illustrates a configuration wherein destination pixels of one column are equally similar to the source pixel, thereby receiving greater than 99% of the redistributed information in total, while those of the opposite column are maximally differentiated, receiving less than 0.2% of the information in total. FIGS. 3F-3J illustrate other relationships between source and destination pixel values and resultant similarities and information redistributions. While the present example uses an exponential fall-off function with a c=0.05 further weighted to take into consideration source to destination pixel proximity, other transforms (e.g., power, etc.), constants, and/or proximity relationships may be used within the scope of the various embodiments and implementations of the invention. In addition, while the present example illustrates a two-dimensional Cartesian array of pixels in which information from a single source pixel is redistributed to the nearest six neighboring or adjacent pixels, other numbers and arrangements of source and destination pixels may be used.

Figure 4:
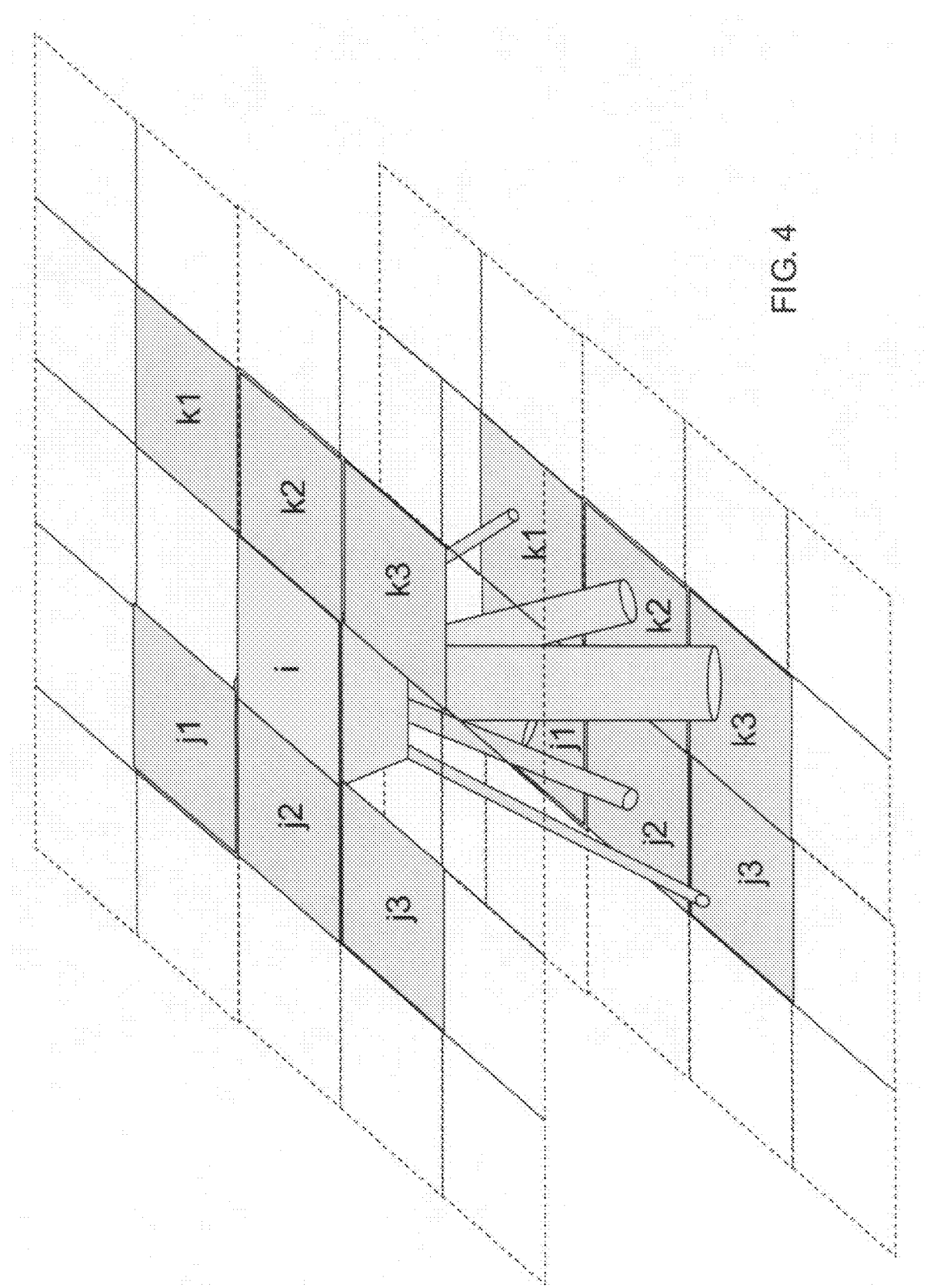
FIG. 4 is a diagram of a portion of an image represented by a grouping of pixels depicting a flow of information from a source pixel to be eliminated to six adjacent "destination: pixels.
Figure 5:
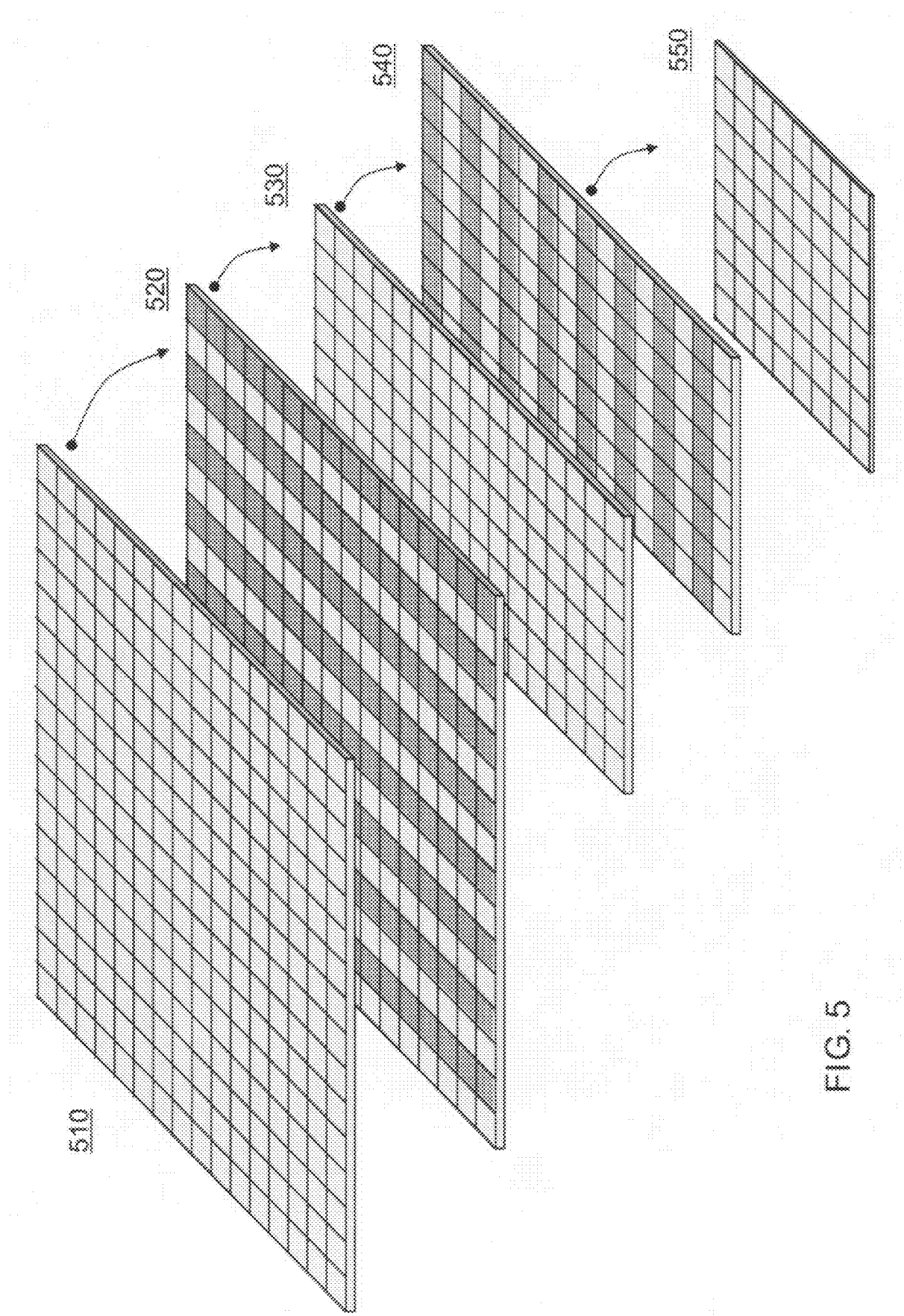
FIG. 5 is a diagram depicting geometric coarsening of an images by elimination of alternate columns and alternate rows of pixels.

Once the redistribution scheme (e.g., redistribution percentages) is calculated, the information contents of source pixel i can be incorporated into (e.g., added to the existing contents of) destination pixels j1, j2, j3, k1, k2 and k3 in the calculated proportions as illustrated in FIG. 4. The redistribution of information is accomplished for each pixel of each column to be eliminated (e.g., all even or all odd columns) so as to completely redistribute the information from those columns into adjacent columns that are to survive the step. For example, referring to FIG. 5, an array 510 consists of a plurality of pixels arranged in columns and rows. Every-other column is selected for elimination in array 520 as indicated by the darkened pixels. The information contained in each of the darkened source pixels is redistributed to the respective nearby adjacent destination pixels as previously described and the selected columns are eliminated (or deleted) as shown in array 530. While the present example shows what appears to be removal of the columns selected for elimination, this may not be necessary. For example, a index value used to reference each column may be doubled or multiplied by "2" instead of actually requiring removal or deletion of columns that are to be eliminated and, upon termination of the entire process might the remaining information be consolidated or copied to any appropriate data structure, e.g., a smaller array.

Note that some pixels may require special processing. For example, pixels falling along an edge of an image that are to be eliminated may have their information distributed into pixels of a single adjacent column. Pixels that are very dissimilar to all possible destination pixels may also be processed differently so as to retain certain image transition characteristics, edges, etc.

Upon the effective or actual elimination of every-other column, every-other row may be designated for elimination as in array 540. As in the case of column elimination, information from each pixel to be eliminated is redistributed into adjacent pixels that are not designated for immediate elimination. In this case, the contents of each pixel of each row to be eliminated is redistributed to the three nearest pixels of each adjacent row. The selected rows can then be eliminated as discussed above in connection with columns to be eliminated, resulting in array 550 that is one quarter the size (i.e., has 25% the number of pixels) of array 510. According to one embodiment of the invention, row elimination may be performed by transposing array 530 to exchange rows with columns and then performing the "column" elimination steps, transposing the array back to original row/column orientation as necessary afterwards.

Figure 6:
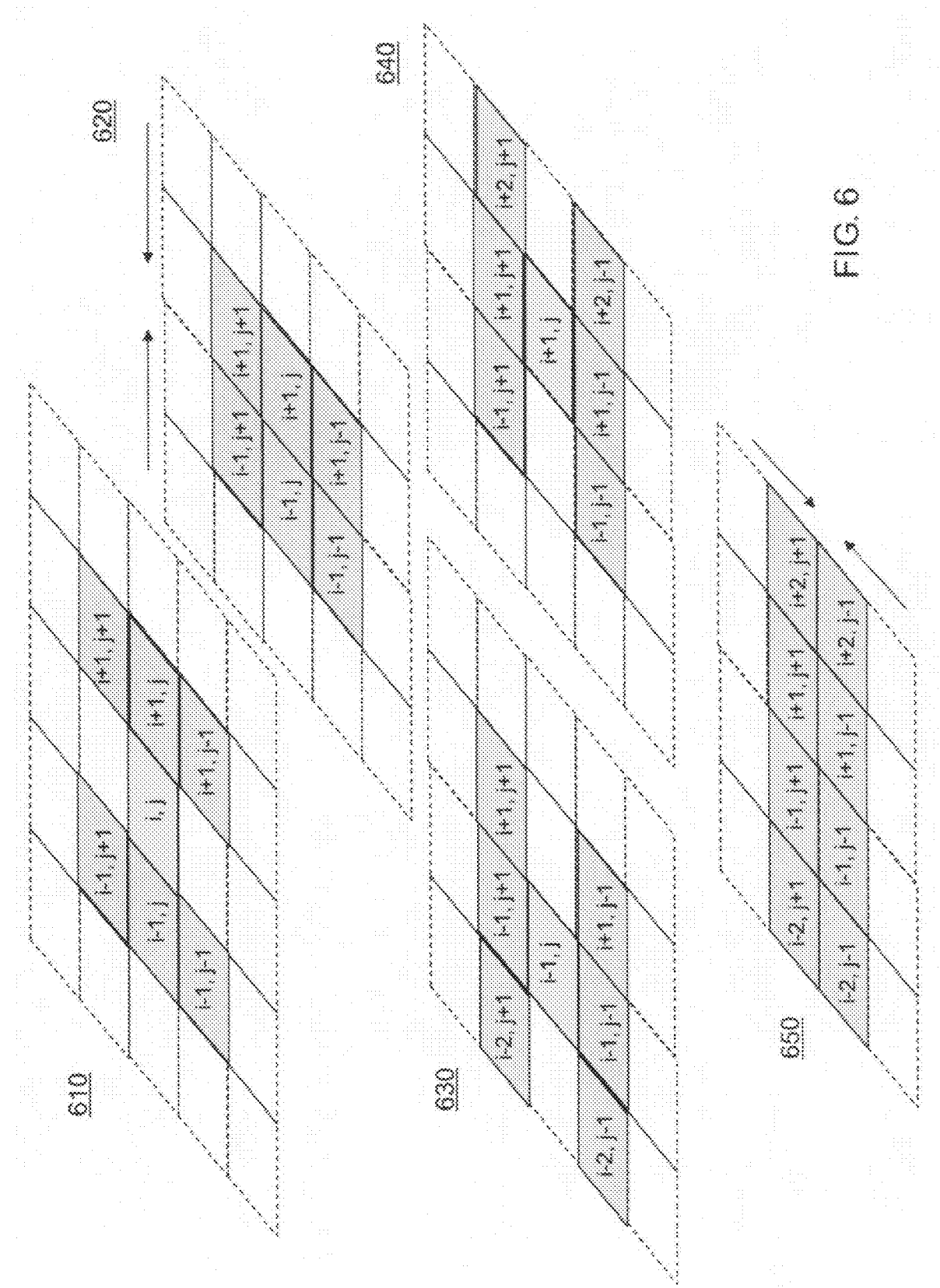
FIG. 6 is a diagram depicting a redistribution of information from a pixel of a column to be eliminated to six destination pixels and the subsequent redistribution of information from the two destination pixels to be eliminated.

FIG. 6 illustrate a generalized sequence of column elimination for all pixels (i, j) of some column "i" (array segment 610), by the redistribution of information contents of each source pixel to destination pixels at (i−1, j+1), (i−1, j), (i−1, j−1), (i+1, j+1), (i+1, j), and (i+1, j−1). Column "i" including pixel (i, j) (together with all other pixels of column "i") can then be eliminated as in array segment 620. Assuming row "j" is one of those selected for elimination, information stored in pixels (i−1, j) and (i+1, j) that had previously received information from pixel (i, j) have their information redistributed into source pixels {(i−2, j+1), (i−1, j+1), (i+1, j+1), (i−2, j−1), (i−1, j−1), and (i−1, j−1)} and {(i−1, j+1), (i+1, j+1), (i+2, j+1), (i−1, j−1), and (i+1, j−1), and (i+2, j−1)}, respectively (array segments 630 and 640). Row j can then be eliminated (array segment 650).

The steps of column and row elimination can be repeated, each iteration reducing the number of pixels by 75% (i.e., leaving one pixel for every group of four pixels) to progressively "coarsen" the image while retaining boundaries and other features that function to segment the image and define semantic objects appearing within the image.

Figure 7:
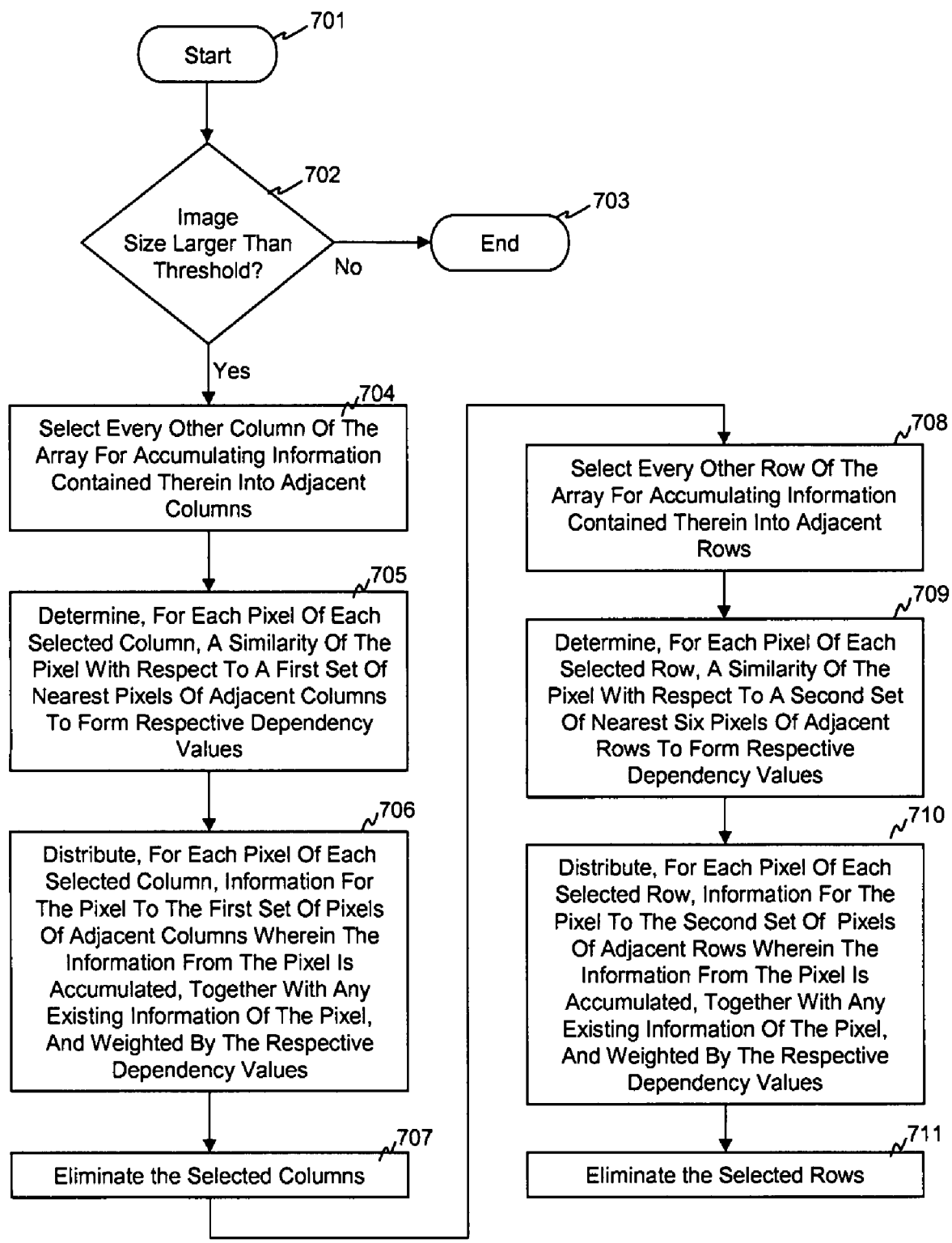
FIG. 7 is a flow diagram of a method including steps performed by apparatus and/or software according to embodiments of the invention.

FIG. 7 is a flow chart of step of a method including steps performed or executed by an apparatus and/or software for finding regions of coherent color and texture properties in still computer images, together with accumulating their various characterizing properties such as average color, average texture, and shape descriptors such as shape moments. Each of the steps or actions may be performed by a suitable platform and/or software. For ease of reference, each step or action may be performed or supported by an appropriate "engine", wherein use of such term in describing embodiments and features of the invention is not intended to be limiting of any particular implementation for accomplishing and/or performing the actions, steps, processes, etc. attributable to the engine. For example, an engine may be, but is not limited to, software, hardware and/or firmware or any combination thereof that performs any portion or combination of the specified step(s), action(s) or function(s)s including, but not limited to, any using a general and/or specialized processor. Software may be stored in or using a suitable machine-readable or computer-readable medium such as, but not limited to, random access memory (RAM) and other forms of electronic storage, data storage media such as hard drives, removable media such as CDs and DVDs, etc. Further, any name associated with a particular engine is, unless otherwise specified, for purposes of convenience of reference and not intended to be limiting to a specific implementation. Additionally, any functionality attributed to an engine may be equally performed by multiple engines, incorporated into the functionality of another or different engine, or distributed across one or more engines of various configurations.

The amount of properties information kept for each region is vastly smaller than the original number of pixels in the region, hence summarizing the information. The regions of an image with their properties are represented by a set of smaller images (one-quarter (¼) of the original image size), one for each accumulated such property. In each of these smaller ('coarser') images the value at every 'coarse' pixel represents the respective accumulated property for one such region in the original image—such as average color, variance in color etc.

For each image property such as intensity the image is transformed into a smaller image (quarter size, via 'coarsening') in which coherent regions are represented each by one pixel, whose value represents the property values for all the image pixels in the corresponding region. For example a weighted averaged intensity (weighted by region partitioning). This process can be applied repeatedly to the resulting images to generate additional same size sets of smaller and smaller images (again image for each property), representing larger and larger regions of the original image.

The following outline addresses the coarsening of a specific property, for example, image intensity values. While a specific sequence and order of steps are presented for purposes of the present illustration, other arrangements may be used and/or implemented. Further, while the present and other examples provide for a reduction or coarsening of a two-dimensional object such as an image, objects of other dimensionalities may be accommodated.

According to the present illustration, a method of geometrically coarsening and segmenting an image starts at step 701. At step 702 a test is performed to determine if a desired image size is present and/or has been achieved. If no processing is required, the process ends at step 703. If coarsening is to begin or continue:

1. First eliminate every second column of the original image (steps 704-707);
   1.1. For each pixel in an eliminated column (step 704) determine its dependencies on its six nearest neighbors in the two nearest surviving columns around it (step 705). The dependencies are set so as to sum up to 1, and always reflect its relative similarity in the color (and intensity) property to each of these six pixels. The four diagonal neighboring pixels are farther away by a factor of sqrt(2) which is also reflected in the dependencies. See equations 1 and 2 above.
   1.2. Accumulate property information from each of the eliminated pixels onto its six neighboring surviving pixels according to the computed dependencies (always set according to color/intensity similarities). See step 706. That is, accumulate at each surviving neighboring pixel the respective portion of the eliminated pixel property value according to the corresponding dependency on the neighbor. For instance accumulating volume starting from property volume=1 for each of the pixels in the original image.
   1.3. Eliminate the selected columns (step 707).
2. Secondly, eliminate every second row similarly to column elimination (steps 708-711). The simplest way is to transpose the image (using a suitable matrix transpose), eliminate its every second column, and transpose it back. This is equivalent to eliminating every second row.

This Coarsening process can be applied repeatedly generating different levels, each time eliminating every second column and every second row so as to generate another higher level getting smaller images. At each level the coarsened images representing the original-image region properties are smaller (thus less regions are represented, each by a single pixel), and the size of the represented regions is larger.

To determine the exact region in pixels of any level which is represented by a single pixel at its 'coarser' higher level it is only necessary to follow the dependencies of the lower-level pixels on this 'coarser' pixel, and their respective portions (for each, in volume/domain) belong to the coarser pixel's volume/domain. This process of revealing which portions of pixels belong to coarser pixels is referred herein as "de-Coarsening". De-Coarsening can be applied to any coarse pixel(s), repeatedly all the way down through lower levels until revealing the dependencies of the original image pixels corresponding to the image segment represented by the coarse pixel(s).

Given an image 'I' the method described herein generates a reduced size image of so-called 'coarse' pixels, where the intensity of each coarse pixel stands for the weighted average intensity of a collection of portions of image pixels, adaptively set so as to average together large portions of neighboring pixels of similar color, weighted by the extent to which colors are similar.

Note that, according to a first step, the pixels in every second (or other) column in the image are eliminated by determining their dependencies on neighboring remaining pixels and averaging their various properties (color, x-location, y-location etc) together with and to be associated with the remaining pixels, with weights depending on (in one embodiment) their color (or, in monochrome, single channel luminance value, etc.) similarity to those neighboring pixels. For each eliminated pixel dependencies are computed for six pixels contained in the closest nearby (i.e., immediately adjacent or "surviving") columns. That is, three closest neighboring pixels to the left and three to the right of each eliminated pixel.

With reference to FIG. 1, an image may be represented by a plurality of pixels arranged in rows and columns. The method to be more fully described eliminates pixels of alternate columns by computing, for each pixel of a column, a normalized similarity with the surrounding pixels, disregarding those of the same column such that only the pixels of the adjacent columns are considered. Having a normalized similarity value relating the pixel to be eliminated to its adjacent pixels, the contents of the pixel to be eliminated are redistributed to the adjacent pixels (again, disregarding those of the same column) proportionate to the normalized similarity where the normalized similarity is distance-weighted, preferring pixels of the same row to those located on a diagonal to the subject pixel. Thus, if column i is to be eliminated (together with columns i±2n), the contents of the pixel at i,j would be redistributed to the nearby pixels of columns i−1 and i+1, i.e., closest pixels located at (i−1, j) and (i+1, j) further weighted by $\sqrt{2}$ and to diagonal pixels (i−1, j−1), (i−1, j+1), (i+1, j−1) and (i+1, j+1) as shown in further detail in FIG. 2a. However, for ease of reference, the following description utilizes an alternative pixel designation scheme as shown in FIG. 2b wherein:

$$(i-1, j+1) = j1$$
$$(i-1, j) = j2$$
$$(i-1, j-1) = j3$$
$$(i, j) = i$$
$$(i+1, j+1) = k1$$
$$(i+1, j) = k2$$
$$(i+1, j-1) = k3$$

Using the notation of FIG. 2b:

a. Every eliminated pixel i (with intensity Ii) has six nearest neighboring pixels in the nearest surviving columns: j1, j2 and j3 on the left and k1, k2 and k3 on the right (numerated from top to bottom on each side see chart below), having the intensity values Ij1, Ij2, Ij3 and Ik1, Ik2 and Ik3 respectively. If I is a color image intensity Ii1 means a three-value vector. Distances as they appear below dist(Ii,Ii1) mean using a vector distance/norm rather then a scalar one distance/norm.

b. A dependency of pixel $I_i$ on $I_{j1}$ is defined to be $$D_{i,j1} = e^{(-c \times dist(I_i, I_{j1}))} \quad \text{(Eq. 3)}$$

and the dependency of pixel Ii on Ik1 to be:

$$D_{i,k1} = e^{(-c \times dist(I_i, I_{k1}))} \quad \text{(Eq. 4)}$$

and similarly $$D_{i,j2} = \sqrt{2} \times e^{(-c \times dist(I_i, I_{j2}))} \quad \text{(Eq. 5)}$$

$$D_{i,j3} = e^{(-c \times dist(I_i, I_{j3}))} \quad \text{(Eq. 6)}$$

$$D_{i,k2} = \sqrt{2} \times e^{(-c \times dist(I_i, I_{k2}))} \quad \text{(Eq. 7)}$$

$$D_{i,k3} = e^{(-c \times dist(I_i, I_{k3}))} \quad \text{(Eq. 8)}$$

where c is a pre-set positive constant for scaling the decrease in dependency by the distance in color. Multiplying the distances for the two nearest neighbors j2 and k2 by $\sqrt{2}$ reflects the fact that they are by that ratio closer to i than the four remaining nearest neighbors j1,j3, k1 and k3.

The dependencies are then normalized to sum to unity or "1". Define $$D = D_{i,j1} + D_{i,j2} + D_{i,j3} + D_{i,k1} + D_{i,k2} + D_{i,k3} \quad \text{(Eq. 9)}$$

and then normalize all dependencies to sum up to one such that:

$$D_{i,j1} \Leftarrow \frac{D_{i,j1}}{D} \quad D_{i,j2} \Leftarrow \frac{D_{i,j2}}{D} \quad D_{i,j3} \Leftarrow \frac{D_{i,j3}}{D} \quad \text{(Eqs. 10-12)}$$

$$D_{i,k1} \Leftarrow \frac{D_{i,k1}}{D} \quad D_{i,k2} \Leftarrow \frac{D_{i,k2}}{D} \quad D_{i,k3} \Leftarrow \frac{D_{i,k3}}{D} \quad \text{(Eqs. 13-15)}$$

Such that now $$D_{i,j1} + D_{i,j2} + D_{i,j3} + D_{i,k1} + D_{i,k2} + D_{i,k3} = 1 \quad \text{(Eq. 16)}$$

Hence all dependencies now reflect the relative extent to which the colors/intensity of pixel i resembles or is similar to the intensities of its neighboring pixels (see FIG. 2b).

c. At this point (i.e., by step (b)) every surviving pixel j in each surviving column has exactly six "to-be-eliminated" nearest neighboring pixels which are depredating on it (from the neighboring columns to be eliminated on its left and right) notated as i1, i2, i3 on its left, and l1, l2, l3 on its right that are respectively depending on it as explained in (b) above by $D_{i1,j}, D_{i2,k}, D_{i3,j}, D_{l1,j}, D_{l2,j}$, and $D_{l3,j}$ (see Table 1 below). The intensity $I_j$ of the surviving pixel j is updated to become $$NewI_j = \frac{(I_j + I_{i1} \times D_{i1,j} + I_{i2} \times D_{i2,j} + I_{i3} \times D_{i3,j} + I_{l1} \times D_{l1,j} + I_{l2} \times D_{l2,j} + I_{l3} \times D_{l3,j})}{D_{i1,j} + D_{i2,j} + D_{i3,j} + D_{l1,j} + D_{l2,j} + D_{l3,j}} \quad \text{(Eq. 17)}$$

where $D_{j,j}=1$.

Having updated the intensities of all the surviving pixels, all the designated columns (every other columns) can be deleted.

TABLE 1

| i.   | i1 | ii.   |   | iii. | L1 |
|------|----|-------|---|------|----|
| iv.  | i2 | v.    | j | vi.  | L2 |
| vii. | i3 | viii  |   | ix.  | L3 |

Chart for aggregating from the eliminated pixels i1,i2,i3,l1, l2,l3 onto the surviving pixel j.

| Surviv. Col | Elimin. Col | Surviv. Col | Elimin. Col | Surviv. Col | Elimin. Col |
|---|---|---|---|---|---|
| j₁ |   | k₁ | i₁ |   | l₁ |
| j₂ | i | k₂ | i₂ | j | l₂ |
| j₃ |   | k₃ | i₃ |   | l₃ |

Chart for the image I with its columns to be eliminated (every second one, all even numbered column) and surviving columns (all odd numbered columns)

d. Every surviving pixel j now can be seen as representing itself, as well as its six nearest neighbors i1, i2, i3, l1, l2 and l3 in a weighted manner by the dependencies:

$$D_{j,j}=1, D_{i1,j}, D_{i2,j}, D_{i3,j}, D_{l1,j}, D_{l2,j}, D_{l3,j} \quad \text{(Eq. 18)}$$

set as explained above by the extent that their original values were similar. That is: the surviving pixel fully represents itself with weight 1, as well as representing a $D_{i1,j}$ portion of pixel i1 and a $D_{i2,j}$ portion of pixel i2, a $D_{i3,j}$ portion of pixel i3, $D_{l1,j}$ portion of pixel l1, a $D_{l2,j}$ portion of pixel l2 and a $D_{l3,j}$ portion of pixel l3. We call this collection of portions of image pixels in the original image which the surviving pixel j now represents—a 'segment' j.

e. We can now 'aggregate' any property the eliminated pixels may have from the image pixels level to be weight-averaged to be associated with each surviving pixel j according to the weights/portions by which the eliminated pixels depend on it in the exact same way as explained in (c) above for obtaining the new Ij. That is for instance if we collect the squared value of the intensities we will aggregate a new value at j, New_Ij^2 defined as:

$$New(I_j)^2 = \frac{((I_j)^2 + (I_{i1})^2 \times D_{i1,j} + (I_{i2})^2 \times D_{i2,j} + (I_{i3})^2 \times D_{i3,j} + (I_{l1})^2 \times D_{l1,j} + (I_{l2})^2 \times D_{l2,j} + (I_{l3})^2 \times D_{l3,j})}{D_{i1,j} + D_{i2,j} + D_{i3,j} + D_{l1,j} + D_{l2,j} + D_{l3,j}} \quad \text{(Eq. 19)}$$

Similarly we can aggregate the x-location of all pixels to create an X-location weighted center of mass by:

$$(X_j)^2 = \frac{((X_j)^2 + (X_{i1})^2 \times D_{i1,j} + (X_{i2})^2 \times D_{i2,j} + (X_{i3})^2 \times D_{i3,j} + (X_{l1})^2 \times D_{l1,j} + (X_{l2})^2 \times D_{l2,j} + (X_{l3})^2 \times D_{l3,j})}{D_{i1,j} + D_{i2,j} + D_{i3,j} + D_{l1,j} + D_{l2,j} + D_{l3,j}} \quad \text{(Eq. 20)}$$

etc.

2. Every other row in the surviving, twice-thinner image (after eliminating every other column) can be eliminated in the same way used to eliminate every other column in 1 above. For example, the image may be transposed so that rows become columns and the steps above used to eliminate every other column again, after which the image may be transposed back to restore the original orientation of the columns and rows. In doing so new segments associated each with each of the remaining pixels were generated, each of which is a collection of weighted portions of seven of the previous stage segments (itself and its six nearest neighbors), which were similarly in their turn each a collection of weighted portions of seven original image pixels (as explain in 1). Hence by transitivity of the dependency process the remaining pixels after stage 2 (after eliminating every other row) each represent a collection of weighted portions of the original image pixels, and their intensity value represents a weighted averaging of the image pixels intensity values, accordingly. Note that collection of the weighted portions of image pixels (segment) is not evenly spread across the image but is rather more strongly (higher weighted portions) spread along pixels whose intensity values resembled the surviving pixel colors more.

3. This process can be repeatedly recursively applied in order to generate smaller and smaller images, in which each pixel represents by way of transitivity of the dependency process larger and larger weighted portions of the original image pixels. The information aggregated from the original image pixels may be averages of intensity/color values, variances of colors, averages of Cartesian locations (e.g. center of mass), and other higher order location moments leading into sharp descriptors (best fitting ellipse etc).

4. For each pixel to-be-deleted i we check its sum of dependencies on the surviving pixels as mentioned in (b), BEFORE normalizing it to be 1, that is:

$$D=D_{i,j1}+D_{i,j2}+D_{i,j3}+D_{i,k1}+D_{i,k2}+D_{i,k3} \quad \text{(Eq. 21)}$$

And in case D is smaller than some pre-determined threshold we keep i in a special list of pixels to survive throughout this entire image 'coarsening process' (process of eliminating columns, and rows generating the smaller images). A small value for D indicates that pixel i represents a segment which is relatively decoupled from the rest of the image and needs to be preserved as a special, standing out visual collection of pixels. The smaller D is the more 'salient' is this segment i.

a. We may start a process of checking pixel i's dependencies also on the nearest pixels just above and beneath it within the column to be deleted, and transitively on their consecutive dependencies on the nearest, farther away (neighbors of neighbors) pixels within the surviving columns, thus searching for a more indirect but stronger and more significant dependency. If such a dependency is found we may change the coarsening process to include also such farther away dependencies wherever needed 5. For much higher efficiency reasons instead of computing $D_{i,j1}$, $D_{i,j2}$, $D_{i,j3}$, $D_{i,k1}$, $D_{i,k2}$, $D_{i,k3}$ (which sum up to 1) as in (b), we may keep previously arranged hash tables so as to deduce these values immediately out of the 7 values of pixels i,j1,j2,j3,k1,k2,k3 by a pre-prepared lookup table.

Figure 8:
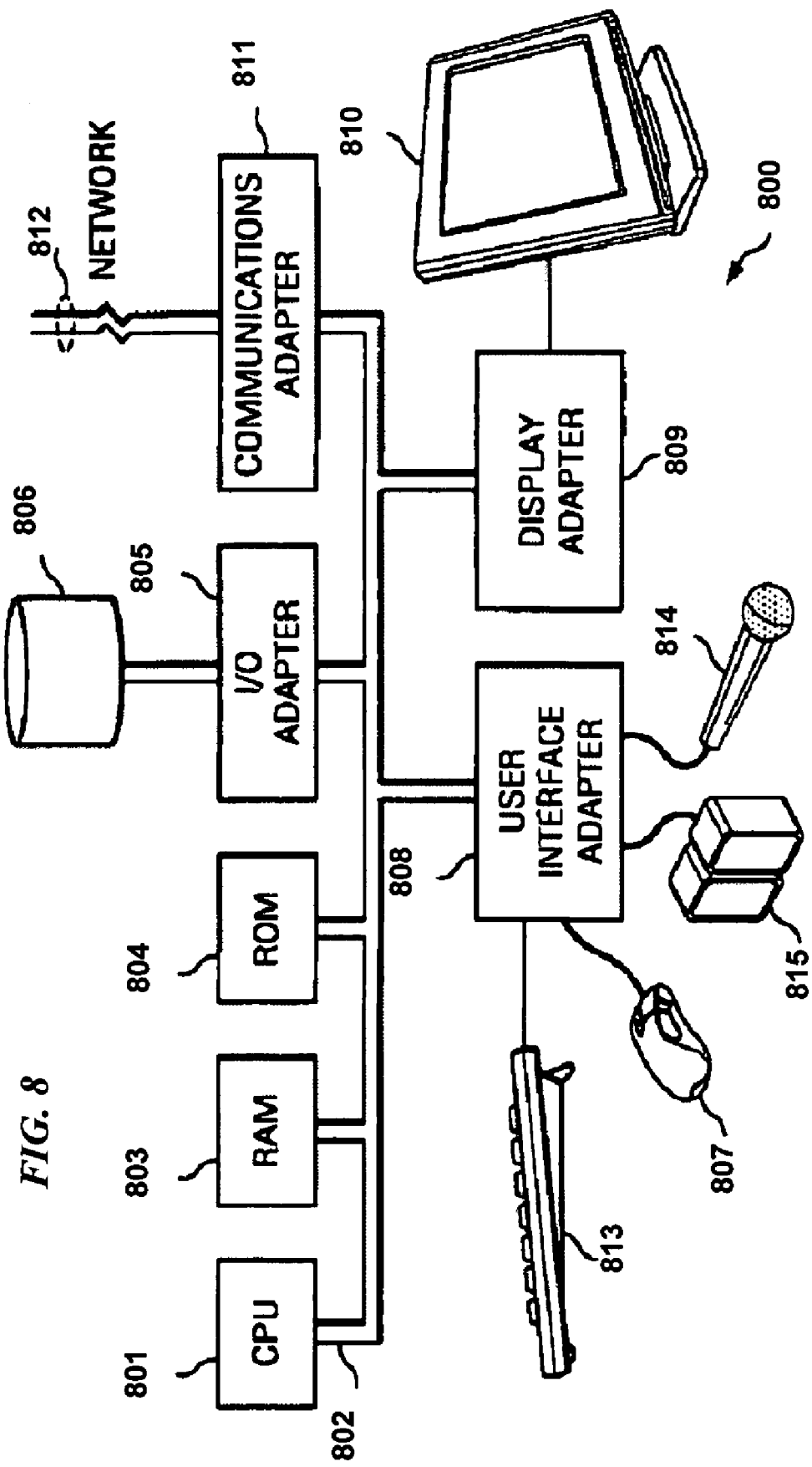
FIG. 8 is a block diagram of a computer platform for executing computer program code implementing processes and steps according to various embodiments of the invention.

FIG. 8 is a block diagram of a computer platform for executing computer program code implementing processes and steps according to various embodiments of the invention. Object processing and database searching may be performed by computer system 800 in which central processing unit (CPU) 801 is coupled to system bus 802. CPU 801 may be any general purpose CPU. The present invention is not restricted by the architecture of CPU 801 (or other components of exemplary system 800) as long as CPU 801 (and other components of system 800) supports the inventive operations as described herein. CPU 801 may execute the various logical instructions according to embodiments of the present invention. For example, CPU 801 may execute machine-level instructions according to the exemplary operational flows described above in conjunction with FIGS. 1 and 2.

Computer system 800 also preferably includes random access memory (RAM) 803, which may be SRAM, DRAM, SDRAM, or the like. Computer system 800 preferably includes read-only memory (ROM) 804 which may be PROM, EPROM, EEPROM, or the like. RAM 803 and ROM 804 hold/store user and system data and programs, such as a machine-readable and/or executable program of instructions for object extraction and/or video indexing according to embodiments of the present invention. ROM 804 may further be used to store image data to be processed, e.g., subject to geometric coarsening and segmentation.

Computer system 800 also preferably includes input/output (I/O) adapter 805, communications adapter 811, user interface adapter 808, and display adapter 809. I/O adapter 805, user interface adapter 808, and/or communications adapter 811 may, in certain embodiments, enable a user to interact with computer system 800 in order to input information.

I/O adapter 805 preferably connects to storage device(s) 806, such as one or more of hard drive, compact disc (CD) drive, floppy disk drive, tape drive, etc. to computer system 800. The storage devices may be utilized when RAM 803 is insufficient for the memory requirements associated with storing data for operations of the system (e.g., storage of videos and related information). Although RAM 803, ROM 804 and/or storage device(s) 806 may include media suitable for storing a program of instructions for video process, object extraction and/or video indexing according to embodiments of the present invention, those having removable media may also be used to load the program and/or bulk data such as large video files.

Communications adapter 811 is preferably adapted to couple computer system 800 to network 812, which may enable information to be input to and/or output from system 800 via such network 812 (e.g., the Internet or other wide-area network, a local-area network, a public or private switched telephony network, a wireless network, any combination of the foregoing). For instance, users identifying or otherwise supplying a video for processing may remotely input access information or video files to system 800 via network 812 from a remote computer. User interface adapter 808 couples user input devices, such as keyboard 813, pointing device 807, and microphone 814 and/or output devices, such as speaker(s) 815 to computer system 800. Display adapter 809 is driven by CPU 801 to control the display on display device 810 to, for example, display information regarding a video being processed and providing for interaction of a local user or system operator during object extraction and/or video indexing operations.

It shall be appreciated that the present invention is not limited to the architecture of system 800. For example, any suitable processor-based device may be utilized for implementing object extraction and video indexing, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications and variations that fall within the true scope of the inventive concepts.

It should also be noted and understood that all publications, patents and patent applications mentioned in this specification are indicative of the level of skill in the art to which the invention pertains. All publications, patents and patent applications are herein incorporated by reference to the same extent as if each individual publication, patent or patent application was specifically and individually indicated to be incorporated by reference in its entirety.

The invention claimed is:

1. An apparatus for performing geometric coarsening and segmenting of an image representable as a two-dimensional array of pixels comprising:
   a) a first engine operable to select every other column of the array to accumulate information contained therein into adjacent columns;
   b) a second engine operable to determine, for each pixel of each selected column, a similarity of said pixel with respect to a first set of nearest pixels of adjacent columns to form respective dependency values;
   c) a third engine operable to distribute, for each pixel of each selected column, information for said pixel to the first set of pixels of adjacent columns wherein said information from said pixel is accumulated, together with any existing information of said pixel, and weighted by the respective dependency values;
   d) a fourth engine operable to select every other row of the array for accumulating information contained therein into adjacent rows;
   e) a fifth engine operable to determine, for each pixel of each selected row, a similarity of said pixel with respect to a second set of nearest six pixels of adjacent rows to form respective dependency values; and
   f) a sixth engine operable to distribute, for each pixel of each selected row, information for said pixel to the second set of pixels of adjacent rows wherein said information from said pixel is accumulated, together with any existing information of said pixel, and weighted by the respective dependency values.

2. The apparatus according to claim 1 wherein said first set of pixels comprise the six nearest pixels in adjacent columns and said second set of pixels comprise the six nearest pixels in adjacent rows.

3. The apparatus according to claim 1 wherein said first, second and third engines operate to perform the corresponding actions prior to operation of said fourth, fifth and sixth engines.

4. The apparatus according to claim 3 wherein, after said actions attributable to said first, second and third engines are performed, and prior to performance of said actions attributable to said fourth, fifth and sixth engines, said selected every other column is deleted and, after said performance of said fourth, fifth and sixth engines, said selected every other row is deleted.

5. The apparatus according to claim 4 wherein said actions attributable to said first, second, third, fourth, fifth and sixth engines are repeated a plurality of times.

6. The apparatus according to claim 1 wherein said similarity of pixels is determined based on specific color information endowed for each pixel and a specific similarity function appropriate to a type of said color information.

7. The apparatus according to claim 5 wherein, for each repetition of said operations performed by said engines a through f, each remaining pixel accumulates additional information from an ever increasing volume of the original image pixels wherein remaining pixels are those not previously deleted.

8. The apparatus according to claim 5 wherein, for each repetition of said operations performed by engines a though f, each remaining pixel is mapped back to portions of pixels in the original image by backtracking the dependencies contributing to its accumulation wherein remaining pixels are those not previously deleted.

9. The apparatus according to claim 5 further comprising an engine operable to map back to portions of pixels in the original image by backtracking the dependencies contributing to its accumulation wherein remaining pixels are those not previously deleted.

10. The apparatus according to claim 1 wherein each pixel in the original image is endowed with color information and at least one additional type of information.

11. An apparatus of reducing the size of an image stored as a two-dimensional array of pixels comprising one or more engines operable to perform the steps of:
    selecting a plurality of columns for elimination, each including a plurality of column-aligned source pixels;

redistributing image information from each of said column-aligned source pixels to corresponding nearest destination pixels of columns adjacent each of said column-aligned source pixels;

eliminating said plurality of columns selected for elimination;

selecting a plurality of rows for elimination, each including a plurality of row-aligned source pixels;

redistributing image information from each of said row-aligned source pixels to corresponding nearest destination pixels of rows adjacent each of said row-aligned source pixels; and eliminating said plurality of rows selected for elimination.

12. The apparatus according to claim 11 wherein said steps of redistributing said image information include steps of determining, for each of said column-aligned and row-aligned source pixels, a similarity of said source pixel with respect to corresponding ones of said nearest destination pixels to form respective dependency values.

13. An apparatus for compressing data stored in a multidimensional array of data elements, the apparatus comprising engines operable to perform the steps of:
   a) selecting a first plurality of subarrays from said multidimensional array, said first plurality of subarrays arranged along a selected one of said dimensions, each of said first plurality of subarrays including a first plurality of source data elements;
   b) determining, for each of said first plurality of source data elements, a similarity of said source data elements with respect to a corresponding set of nearest destination data elements to form respective dependency values;
   c) distributing data corresponding to each of said first plurality of source data elements to the corresponding set of nearest destination data elements wherein said information from said source data elements is accumulated, together with any existing information of said nearest destination data elements and weighted by the respective dependency values;
   d) selecting a next plurality of subarrays from said multidimensional array, said next plurality of subarrays arranged along another of said dimensions and each including another plurality of source data elements; and
   e) repeating steps b-c with said next plurality of subarrays.

14. A non-transitory computer usable medium having computer readable program code embodied therein for geometric coarsening and segmenting of an image representable as a two-dimensional array of pixels, the computer readable program code including:
   a) computer readable program code for causing the computer to select every other column of the array for accumulating information contained therein into adjacent columns;
   b) computer readable program code for causing the computer to determe, for each pixel of each selected column, a similarity of said pixel with respect to a first set of nearest pixels of adjacent columns to form respective dependency values;
   c) computer readable program code for causing the computer to distribute, for each pixel of each selected column, information for said pixel to the first set of pixels of adjacent columns wherein said information from said pixel is accumulated, together with any existing information of said pixel, and weighted by the respective dependency values;
   d) computer readable program code for causing the computer to select every other row of the array for accumulating information contained therein into adjacent rows;
   e) computer readable program code for causing the computer to determine, for each pixel of each selected row, a similarity of said pixel with respect to a second set of nearest six pixels of adjacent rows to form respective dependency values; and
   f) computer readable program code for causing the computer to distribute, for each pixel of each selected row, information for said pixel to the second set of pixels of adjacent rows wherein said information from said pixel is accumulated, together with any existing information of said pixel, and weighted by the respective dependency values.

15. The computer usable medium according to claim 14 wherein said first set of pixels comprise the six nearest pixels in adjacent columns and said second set of pixels comprise the six nearest pixels in adjacent rows.

16. The computer usable medium according to claim 14 wherein said computer readable program code for causing the computer to perform actions a, b and c operates prior to the program code for causing the computer to perform the actions of d, e and f.

17. The computer usable medium according to claim 16 wherein, after said computer readable program code causes the computer to perform actions a, b and c, and prior to operation of said computer readable program code causing the computer to perform actions d, e and f, computer readable program code causes said selected every other column to be deleted and, after said actions d, e and f, computer readable program code causes said selected every other row to be deleted.

18. The computer usable medium according to claim 17 wherein said computer readable program code operates to repeatedly perform actions a through f a plurality of times.

19. The computer usable medium according to claim 14 wherein said similarity of pixels is determined based on specific color information endowed for each pixel and a specific similarity function appropriate to a type of said color information.

20. The computer usable medium according to claim 18 wherein, for each repetition of actions a through f, each remaining pixel accumulations additional information from an ever increasing volume of the original image pixels wherein remaining pixels are those not previously deleted.

21. The computer usable medium according to claim 18 wherein, for each repetition of actions a though f, each remaining pixel is mapped back to portions of pixels in the original image by backtracking the dependencies contributing to its accumulation wherein remaining pixels are those not previously deleted.

22. The computer usable medium according to claim 16 further comprising computer readable program code for causing the computer to map back to portions of pixels in the original image by backtracking the dependencies contributing to its accumulation wherein remaining pixels are those not previously deleted.

23. The computer usable medium according to claim 14 wherein each pixel in the original image is endowed with color information and at least one additional type of information.

24. A non-transitory computer usable medium having computer readable program code embodied therein for reducing the size of an image stored as a two-dimensional array of pixels, the computer readable program code including:
   computer readable program code for causing the computer to select a plurality of columns for elimination, each including a plurality of column-aligned source pixels;

computer readable program code for causing the computer to redistribute image information from each of said column-aligned source pixels to corresponding nearest destination pixels of columns adjacent each of said column-aligned source pixels;

computer readable program code for causing the computer to eliminate said plurality of columns selected for elimination;

computer readable program code for causing the computer to select a plurality of rows for elimination, each including a plurality of row-aligned source pixels;

computer readable program code for causing the computer to redistribute image information from each of said row-aligned source pixels to corresponding nearest destination pixels of rows adjacent each of said row-aligned source pixels; and computer readable program code for causing the computer to eliminate said plurality of rows selected for elimination.

25. The computer usable medium according to claim 24 further comprising computer readable program code for causing the computer to determine, for each of said column-aligned and row-aligned source pixels, a similarity of said source pixel with respect to corresponding ones of said nearest destination pixels to form respective dependency values.

26. A non-transitory computer usable medium having computer readable program code embodied therein for compressing data stored in a multidimensional array of data elements, the computer readable program code including:

a) computer readable program code for causing the computer to select a first plurality of subarrays from said multidimensional array, said first plurality of subarrays arranged along a selected one of said dimensions, each of said first plurality of subarrays including a first plurality of source data elements;

b) computer readable program code for causing the computer to determine, for each of said first plurality of source data elements, a similarity of said source data elements with respect to a corresponding set of nearest destination data elements to form respective dependency values;

c) computer readable program code for causing the computer to distribute data corresponding to each of said first plurality of source data elements to the corresponding set of nearest destination data elements wherein said information from said source data elements is accumulated, together with any existing information of said nearest destination data elements and weighted by the respective dependency values;

d) computer readable program code for causing the computer to select a next plurality of subarrays from said multidimentional array, said next plurality of subarrays arranged along another of said dimensions and each including another plurality of source data elements; and e) computer readable program code for causing the computer to repeat actions b-c with said next plurality of subarrays.

* * * * *